United States Patent [19]
Albanese
[11] Patent Number: 4,483,783
[45] Date of Patent: * Nov. 20, 1984

[54] SOLVENT PREPARATION

[75] Inventor: James J. Albanese, Eureka, Mo.

[73] Assignee: United Industries Corporation, St. Louis, Mo.

[ * ] Notice: The portion of the term of this patent subsequent to Mar. 27, 2001 has been disclaimed.

[21] Appl. No.: 368,587

[22] Filed: Apr. 15, 1982

[51] Int. Cl.³ .......................... B01F 1/00; B01J 13/00; C23G 5/02

[52] U.S. Cl. .................................... 252/312; 106/311; 252/11; 252/49.5; 252/305; 252/311; 252/364; 252/548; 252/DIG. 5; 252/DIG. 8; 252/DIG. 14

[58] Field of Search ................ 252/311, 312, 11, 49.5, 252/548, DIG. 8; 426/811; 106/243, 311; 424/45, 47, 358

[56] References Cited

U.S. PATENT DOCUMENTS

| | | | |
|---|---|---|---|
| 3,650,956 | 3/1972 | Strand et al. | 252/153 X |
| 3,929,492 | 12/1975 | Chapman et al. | 106/3 |
| 3,958,059 | 5/1976 | Diehl | 252/548 X |
| 4,439,342 | 3/1984 | Albanese | 252/305 |
| 4,439,343 | 3/1984 | Albanese | 252/305 |
| 4,439,344 | 3/1984 | Albanese | 252/312 |

FOREIGN PATENT DOCUMENTS

| | | | |
|---|---|---|---|
| 939366 | 10/1963 | United Kingdom | 252/548 |
| 1026831 | 4/1966 | United Kingdom | 424/45 |

*Primary Examiner*—Richard D. Lovering
*Attorney, Agent, or Firm*—Kalish & Gilster

[57] ABSTRACT

A solvent preparation in the nature of a dispersion wherein the solvent is the active ingredient for acting directly upon the agent to be treated, with the solvent being water soluble or water insoluble or combinations thereof, and incorporating a dispersal agent consisting of cocodiethanolamide.

11 Claims, No Drawings

SOLVENT PREPARATION

BACKGROUND AND SUMMARY OF THE INVENTION

The present invention relates in general to solvent preparations and, more particularly, such preparations wherein the solvent constitutes the active ingredient as distinguished from functioning as a vehicle or carrier for a particular solute.

In connection with the present invention, it is to be understood that in considering a solvent as an active ingredient, one is concerned with the capacity or function of a solvent to act directly upon an agent or composition to be treated, as distinguished from utilization as a mere vehicle or carrier for solubilizing compositions to render the latter efficacious with predetermined compounds and the like. Traditionally, in chemical specialties manufacturing, the term "solvent" has consistently signified, or referred to, a vehicle or carrier for a particular ingredient or class of ingredients, which latter have been customarily denominated as "actives"; the same being the specific chemical selected to perform the indicated reaction. Thus, solvents, in essence, acting in the solubilizing capacities thereof, do not act directly upon the agent to be treated, but subserviently merely carry or extend the active agent. Exemplary of the foregoing is the fact that certain silicone lubricants are carried in solvents, such as, methylene chloride, and then as so solubilized or carried, is applied to the part to be lubricated. In such application the methylene chloride does serve several purposes, namely to facilitate handling of the silicone fluid; to effect the utilization of that amount of silicone necessary to accomplish the particular purpose, avoiding waste; and to provide certain film-forming characteristics. All of such purposes of the solvent, methylene chloride, are "solvent related" in that the same are concomitant of the vehicular or carrier purposes of such solvent.

In the present invention, however, the term "solvent" is understood as identifying a composition or preparation which performs the ultimate active task and thus becomes the "active ingredient" of a unique group of formulated products. Illustrative of the foregoing is a preparation designed to effect paint removal wherein methylene chloride, though generally recognized as a solvent in the vehicle or carrier sense, is now the primary active ingredient which renders the preparation capable of effecting the intended function, namely—paint removal. Similarly, in products formulated for electrical motor degreasing, certain compounds considered as solvents in the classical sense, such as, 1,1,1-trichlorethane and perchlorethylene, may be embodied as the active degreasing agent.

Heretofore, efforts to utilize solvents as one of the primary inter-reactive agents in a preparation has, for the most part, constituted merely endeavoring to emulsify the solvent. It is fully believed that by such emulsification the quantity of solvent utilized would actually be as active in a non-emulsified state. Such emulsified solvents have not proved successful and have not been adopted in even a limited, general sense since the same have performed in a consistently poor manner, markedly inferior to that achieved by use of non-emulsified solvents, and also that since only water insoluble solvents could be emulsified, there was, perforce, omitted the considerably broad range of water soluble solvents.

However, in utilizing water soluble solvents as an active ingredient in current efforts, the only technique other than using the solvent in full strength has been to dilute same with water. Such dilution brings about a direct diminishing effectiveness of the solvent so that as the strength of the same is reduced, the capability or performance of such water soluble solvent is correspondingly weakened.

Therefore, the present invention resides in rendering preparations wherein either or both water insoluble and water soluble solvents serve efficiently as the active ingredient, but wherein emulsification of the water in soluble component, and water dilution of the water soluble solvent, are unnecessary even though such solvents are not incorporated in full strength state, but rather in a markedly, economically productive, relatively reduced amount so that but a fraction of the same may be embodied and productive of results heretofore achieved only with full strength conditions.

The achievement of these remarkable results has been brought about by the incorporation in the particular preparations of a limited amount of a chemical which serves to cause the solvent preparation to be a dispersion. This specific agent is cocodiethanolamide, the use of which for forming dispersions of well recognized active ingredients such as, for example, water-base paints, mold release and lubricating agents, synthetic lubricants, belt dressings, common greases, lubricant coatings, waxes, etc., as an aerosolization, has been disclosed in applicant's co-pending Application Ser. No. 282,050, now U.S. Pat. No. 4,439,343, and Ser. No. 237,155, now U.S. Pat. No. 4,439,342, entitled "Aerosol Preparations", and as in bulk form in pending Application Ser. No. 250,745, now U.S. Pat. No. 4,439,344, entitled "Water Dispersions". However, in none of these applications has there been considered or taught the embodying of a solvent, as above explicated, as the active ingredient. Any solvents alluded to in such pending applications have been in the traditional context, such as, subordinatingly providing vehicle or carrier functions, or conducing to the bonding characteristics of a particular active ingredient and the like. The present invention further differentiates in demonstrating that a singularly limited quantity of such dispersing agent is sufficient for adapting solvents for active ingredient roles, which quantities are of unexpected minute character.

Therefore, it is an object of the present invention to provide preparations wherein a solvent constitutes the active ingredient and which is in an amount markedly less than that normally required by the solvent for the intended activity.

It is another object of the present invention to provide preparations of the character stated wherein the solvent may be either water soluble or water insoluble, or preselected combinations or mixtures of the same, there being no limitation to the types of solvent or relative proportionality requisite for efficacy. Thus, a preparation with such a mixture will permit concurrent treatment of the diverse water soluble and water insoluble components of a reactive deposit or intermixture.

It is a still further object of the present invention to provide preparations of the character stated, being in the nature of dispersions, which are economically formulated.

It is another object of the present invention to provide preparations of the character stated which may be formulated with a minimum number of ingredients, with substantially relatively reduced amounts of the solvent or solvents embodied so that substantial economies are brought about in production.

As indicated above, the present invention may comprehend a multiplicity of water insoluble solvents or water soluble solvents as distinguished from mixtures of the same so that a reactive mass normally requiring sequential treatment by a series of solvents of one type or the other may be concurrently subjected to the related solvent.

It is a further object of the present invention to provide preparations of the character stated which obviate the necessity of forming emulsifications of water insoluble solvents and distinct solutions of water soluble solvents as have heretofore been so unsatisfactorily utilized.

It is another object of the present invention to provide preparations of the character stated which eliminate hazards and perils in usage which would have attended utilization of the particular solvents in their normal undiluted states.

It is an additional object of the present invention to provide preparations of the type hereinabove discussed wherein the same are amenable to presentation for use in any preselected form, such as, as an aerosol, or for bulk distribution, such as through a pump spray, or by direct manual application with a suitable applicator.

DESCRIPTION OF THE INVENTION

The present invention contemplates, in essence, the development of a preparation in the nature of a dispersion wherein a solvent is the active ingredient and with the latter being in an amount substantially reduced from that when utilized in the customary undiluted state thereof.

As indicated above, it is understood that herein a "solvent" is to be considered as an agent capable of acting directly upon a composition to be treated, as distinguished from serving as a solubilizer, as it were, for some other active ingredient to carry the latter for facilitating the capacity of the other to react within a given condition or environment. In considering solvents as active ingredients one may, without limitation, and merely for purposes of illustration, include agents for dissolving resins, lacquers and other types of coatings or claddings, agents for dirt removal, lubricating agents, cleaning agents, cooling agents, degreasers, etc.; there being no effort to restrict this categorization.

Within the class of solvents herein considered are water soluble, as well as water insoluble types, with the same generally being of organic nature. It is to be understood that the preparations may contain one or more water insoluble solvents; one or more water soluble solvents; and any preselected combination or mixtures of the same. The preparations, in addition to the active solvent, comprehend water and a markedly limited quantity of cocodiethanolamide* which functions as a dispersing agent in this system as contradistinguished from its heretofore recognition as an emulsifying agent. This unusual property as utilized in the present invention is not entirely understood. But it would appear that the amount is insufficient to serve as an emulsifier, but adequate to cause the development of a dispersion. This unexpected and surprising property thus permits of the use of but relatively reduced amounts of the solvent with the replacement by water so that without sacrifice in effectiveness of the resultant preparation, marked economies are achieved by such quantitative reductions. Furthermore, it is, of course, well known that a multiplicity of solvents are inherently hazardous in usage and require the exercise of certain procedures for reducing, if not eliminating, the potential for such hazards. By the present invention, these inherent dangers are automatically reduced, if not obviated, by reason of the lesser amount of the solvent required.

*A preparation of this compound which is fully effective for the purpose of this invention constitutes an amber liquid having a congealing point of approximately 6° C. and with a specific gravity at 25° C. of 0.99. The free or unreacted fatty acid, as lauric, 3%-4% maximum and the pH 1% dispersion is between 8 and 9. This compound is stated to possess solubility in alcohols, glycols, ketones, esters, aromatic and aliphatic carbons and chlorinated solvents, while also being dispersible in water at low concentrations of 1 to 2%. It is stated to become soluble at higher concentrations and with a 10% solution being quite viscous approximating a gel. Such preparation is commercially offered under the trademark CLINDROL 101-CG by Clintwood Company, Chicago, Ill.

In the event the particular solvent serving as the active ingredient is water soluble, it is requisite to incorporate within the preparation a water insoluble component in order to prevent the solvent from forming a solution with the water to be added. Such water insoluble component may be of extremely limited quantity as such is adequate to inhibit solution formation. If the preparation comprises both water insoluble and water soluble active solvents, then the water insoluble solvent constituent will effectively serve in the additional capacity as a solution-forming inhibitor. On the other hand, with water soluble solvents, it is not requisite that the agent preventing solution formation be a water insoluble solvent but such may be of any composition which is water insoluble.

In actual practice, as with water insoluble solvents, the same are combined with a predetermined quantity of water and a limited quantity of cocodiethanolamide and suitably agitated or intermixed. However, since a dispersion is formed, the preparation must be subjected to agitation immediately prior to dispensing as upon the particular surface to be treated. With water soluble active solvents, the aforesaid water insoluble component is intermixed with the other ingredients. The cocodiethanolamide, thus, as brought out above, prevents the development of either an emulsion, or a solution, depending upon the water characteristics of the solvent or solvents.

As pointed out, the solvent preparations of this invention actually have quite consistently performed in a manner of substantially greater effectiveness than that wherein the solvents have been used alone in an undiluted state. Such action can only be considered synergistic since the results are undeniably evidentiary of such effectiveness, but the precise underlying principle bringing about such a result is not readily determinable.

A most substantial range of organic solvents are amenable to incorporation in preparations formulated in accordance with the present invention wherein such solvents serve as the active ingredients and, thus, are not utilized for subordinate purposes with respect to an active ingredient of other properties. Thus, without intention to limit, but merely to suggest the most considerable range of solvents useful in the present invention, the following will be suggestive of the versatility of this invention. Included are: aromatic hydrocarbons, such as, benzene, toluene, xylene, naphthalene, etc.; as well as those with hydroxyl radicals, such as, phenol, cresols, xylenols, etc.; aliphatics and aliphatic petroleum napthas, such as, pentane, heptane, hexane, kerosene and deodorized kerosene, VM&P naphtha. Also useful are lacquer diluents, napthol spirits, mineral seal oil, mineral spirits, odorless mineral spirits, petroleum ether, Stoddard solvent, textile spirits, isoparaffinic hydrocarbons, paraffinic oils, and white oils, such as DRAKEOL OIL #7*, as well as mixtures and blends thereof. Another suitable class of solvents is the chlorinated hydrocarbons, such as, carbon tetrachloride, technical chloroform, ethylene dichloride, methylene chloride, perchlorethylene, propylene dichloride and trichlorethylene. Also useful are the alcohols—n-butanol, 2-butanol, cyclohexanol, 2-ethylhexanol, 2-ethylisohexanol, furfuryl alcohol, isobutanol, isopropanol, methanol, methyl amyl alcohol, 2-methyl butanol, n-propanol, and tetrahydrofurfuryl alcohol. Examplary among the broad group of esters are: amyl acetate, n-butyl acetate, butyl acetate, ethyl acetate, 2-ethylhexyl acetate, diethylene glycol monobutyl ether acetate, ethylene glycol monobutyl ether acetate, isobutyl acetate, isobutyl isobutyrate, isopropyl acetate, and n-propyl acetate. Illustrative of the glycols are: diethylene glycol, dipropylene glycol, ethylene glycol, hexylene glycol, propylene glycol, triethylene glycol, and tripropylene glycol. Typical among glycol ethers are the following: diethylene glycol monobutyl ether, diethylene glycol monoethyl ether, diethylene glycol isobutyl ether, diethylene glycol monomethyl ether, dipropylene glycol monomethyl ether, ethylene glycol monobutyl ether, ethylene glycol monoethyl ether, ethylene glycol monohexyl ether, ethylene glycol isobutyl ether, ethylene glycol monomethyl ether, propylene glycol monomethyl ether, and tripropylene glycol monomethyl ether.

*DRAKEOL is a trademark of Pennreco Inc. of Butler, Pa. for a series of white mineral oils, being hydrocarbon distillates meeting the U.S.P. XV and N.F. X requirements for "petrolatum liquidum".

In the group of ketones, the following are examples: acetone, cyclohexanone,diacetone alcohol, diisobutyl keton, ethyl amyl ketone, isophorone, mesityl oxide, methyl n-butyl ketone, methyl ethyl ketone, methyl heptyl ketone, methyl isoamyl ketone, and methyl isobutyl ketone.

Demonstrative of the phthalate solvents are: dibutyl phthalate, di (2-ethylhexyl) isophthalate, di (2-ethylhexyl) phthalate, diethyl phthalate, di isodecyl phthalate, and dimethyl phthalate.

In addition to the foregoing, there may be included ethers and oxides, such as, dioxane, ethyl ether, and tetrahydrofuran.

Additionally, fluorocarbons may be utilized in dispersions of the present invention, and the following are merely a few of the considerable number of these compounds: trichlorofluoromethane, dichlorodifluoromethane, chlorotrifluoromethane, tetrafluoromethane, dichlorofluoromethane, chlorofluoromethane, fluoroform, 1,1,2-trichloro-1,2,2-trifluoroethane, 1,2-dichloro-1,1,2,2-tetrafluoroethane, chloropentafluoroethane, and hexafluoroethane.

Referred to hereinabove is the fact that the foregoing solvents, and all other solvents of which they are merely examples, may be intermixed within a single preparation for endowing the same with the desired properties and with water soluble and water insoluble solvents being subject to such blending and mixing.

Thus, the choice of the solvent or solvent combination is dictated by the material to be treated.

Solvent preparations formulated in accordance with the present invention, wherein the active solvent is water insoluble, would be as follows:

| | BY WEIGHT |
|---|---|
| ACTIVE SOLVENT OR MIXTURE OF SOLVENTS | Approx. 0.1% to 89.9% |
| DISPERSAL AGENT: | |
| Cocodiethanolamide | Approx. 0.1% to 10% |
| WATER | Approx. 10% to 99.8% |

In those dispersions wherein the active solvent is water soluble, the following would constitute the general formulation:

| | BY WEIGHT |
|---|---|
| ACTIVE SOLVENT OR MIXTURE OF SOLVENTS | Approx. 0.1% to 89.8% |
| DISPERSAL AGENT | |
| Cocodiethanolamide | Approx. 0.1% to 10% |
| WATER INSOLUBLE INGREDIENT | Approx. 0.1% (Min.)* |
| WATER | Approx. 10% to 90% |

*This is indicated simply as a minimum amount since obviously additional amounts would be superfluous even though suitably functioning to prevent solution formation.

In the foregoing, it may be assumed that the water insoluble ingredient is other than a water insoluble solvent.

In those preparations wherein the solvent is actually constituted of an intermixture of water soluble and water insoluble solvents, the following would be a general formulation for the dispersion to be formed:

| | BY WEIGHT |
|---|---|
| MIXTURE OF WATER SOLUBLE AND WATER INSOLUBLE SOLVENTS IN PRESELECTED PORTIONS | Approx. 0.1% to 89.9% |
| DISPERSAL AGENT | |
| Cocodiethanolamide | Approx. 0.1% to 10% |
| WATER | Approx. 10% to 90% |

The foregoing formulation demonstrates the absence of a water insoluble ingredient other than a water insoluble solvent or solvents which, as discussed above, serve to inhibit solution formation by the water soluble solvent and the water.

Although the general formulations above discussed reveal an upper limit of the active solvents of 89.9% by weight, such should be recognized as theoretical as opposed to the practical, since actually, in performing dispersions in accordance with the foregoing general formulations, the active solvent is in a quantity materially reduced from such maximum, being actually as within the range of 20–50% by weight since such has consistently been found quite adequate for the high level of efficacy sought.

As indicated from the general formulations above, the minimum amount of cocodiethanolamide which is efficacious in a major portion of the preparations under study is but 1/10th of 1% by weight of the preparation, although increased amounts up to a maximum of 10% may, in certain instances, be requisite. However, above 10% no enhanced capacity is provided so that such increase is uneconomical.

The application of these formulations will become more edifying as a study is made of certain exemplary, specific formulae set forth hereinbelow.

EXAMPLE I

The following formula is demonstrative of one wherein a mixture of water insoluble solvents are utilized by preparing a dispersion suitable for an automotive engine degreaser:

| | PERCENT BY WEIGHT |
|---|---|
| SOLVENT | |
| Hi-Sol 15* (aromatic solvent) | 25% |
| Kerosene | 25% |
| DISPERSAL AGENT | |
| Cocodiethanolamide | 0.5% |
| WATER | 49.5% |

*Hi-Sol 15 is a trademark of R. J. Brown Mfg. for a series of aromatic solvents useful as general industrial solvents.

Prior to the present invention, a typical engine degreasing formula would consist of a mixture of aromatic and aliphatic solvents and an emulsifier, which degreaser was sprayed on the engine and then washed off with water. A typical formula for a degreaser of such earlier type would be: kerosene—50%; Hi-Sol 15–47%; polyglyceroloteate—3%. The application of this earlier type of degreaser was effected in two-steps rather than in one, as achieved by the present invention. The water, which was added by the second step, caused the formation of emulsion, the removal of which was facilitated by the involved solvent or solvents. The total cleaning effect by such earlier preparation was not obtained until the emulsion had been formed which was required in order to remove the water soluble components of the deposit being attacked. With the preparations developed by the present invention, only a single step procedure is required for effecting the desired cleaning of both water soluble and water insoluble components of the materials to be removed, and should there be any ultimate rinsing or washing, such is solely for cosmetic purposes, without any pertinency to the removal of the attacked deposit.

Although the above formulation is exemplary of a degreaser, it is to be recognized that the active solvent or solvents may be substituted by solvents adapted to accomplish particular cleaning objectives. Thus, for a household cleaning agent, one need merely replace the kerosene with another water insoluble solvent, such as, odorless mineral spirits, or any other effective solvent, the selection of which would be within the knowledge of one having ordinary skill in this art; and, if desired, a pleasant fragrance, such as, mint or lemon, could be included to make it especially adaptable for home usage, such being without constituting a part of the present invention.

EXAMPLE II

The following exemplifies the constitution of a dispersion preparation in accordance with the present invention, for providing a solvent particularly adapted for cleaning electrical parts:

| | PERCENT BY WEIGHT |
|---|---|
| SOLVENT | |
| 1,1,1-trichlorethane | 30% |
| DISPERSAL AGENT | |
| Cocodiethanolamide | 0.1% |
| WATER | 69.9% |

The foregoing formulation which incorporates a water insoluble solvent demonstrates the limited quantity of solvent necessary with the present preparations for providing a level of effectiveness which, in prior formulations, necessitated 100% of the solvent. With respect to cleaning of electrical parts incorporating plastic, dispersion preparations can be prepared in accordance with the present invention to embody solvents which will not adversely affect the plastic, such as, for example only, trifluorotrichloroethane commercially offered as DuPont's Freon 113.

EXAMPLE III

The following formula demonstrates a dispersion prepared in accordance with the present invention which embodies a mixture of both water soluble and water insoluble solvents. This particular example is suitable for automotive choke and carburetor cleaning purposes:

| | PERCENT BY WEIGHT |
|---|---|
| SOLVENTS | |
| Methylene Chloride | 8% |
| Xylene | 15% |
| Ethylene Monobutyl Glycol Ether | 7% |
| DISPERSAL AGENT | |
| Cocodiethanolamide | 0.1% |
| WATER | 69.9% |

Prior to this invention a typical formulation consisted of a mixture of solvents designed to remove lacquer buildups on and inside the automotive choke, as well as dissolution of resinous gum deposits and other residues caused by engine combustion. Such formulation would also involve an aromatic solvent, such as xylene or toluene, or alkyl chlorinated solvents, such as, methylene chloride or ketones, e.g. methyl ethyl ketone. A topical commercial formulation would have been 75% xylene and 25% methyl ethyl ketone. However, the above-referred to solvents and the types exemplified thereby would not effect ready removal of carbon deposits. But, by the present invention, with the addition of water and ethylene monobutyl glycol ether a synergism is developed which will promote the concurrent removal of carbon and all of this with considerably reduced amounts of the solvents for operation upon the automotive choke. Thus, the present dispersion formulations are more effective than present commercial compositions, as well as providing enhanced safety and marked economy. The foregoing also demonstrates a dispersion for dissolving resins.

EXAMPLE IV

The following example typifies a preparation in accordance with the present invention which possesses topical antiseptic usage, and with the active solvent being water soluble:

| | PERCENT BY WEIGHT |
|---|---|
| SOLVENT | |
| Isopropanol | 20% |
| DISPERSAL AGENT | |
| Cocodiethanolamide | 0.5% |
| WATER INSOLUBLE INGREDIENT | |
| White Mineral Oil | 0.5% |

-continued

| | PERCENT BY WEIGHT |
|---|---|
| WATER | 79% |

The foregoing shows that only 1/5th of the normal customary amount of isopropanol is necessary for accomplishing the intended purpose. Since the solvent in this formulation is water soluble, a water insoluble ingredient is inserted, such as, white mineral oil, to inhibit the formation of a solution.

Accordingly, the examples set forth above lucidly reveal the versatility, as well as the marked attributes, of the present invention. The range of solvents is myriad which are amenable to dispersion preparations in accordance with the present invention, and with the same being in markedly reduced amounts from the usual 100%, but without any diminution in efficacy. Additionally, the capability of including a multiplicity of solvents, whether water soluble or water insoluble, or both, promotes one-step procedures for treating compositions which may be of diverse components, with each necessitating a particular type of solvent for achievement of the intended results. Dispersion preparations of the present invention bring about singular economies in production since the same allow for water to replace the eliminated proportions of the particular solvents.

The process for compounding preparations in accordance with the present invention are easily achieved without the involvement of costly, specially designed equipment. The solvent or solvents to be involved in any particular preparation are initially intermixed with the dispersal agent, as by any suitable agitating means, with such intermixture continuing until a visually determined homogeneity is obtained. At this juncture the predetermined amount, or requisite balance, of water is then added to the intermixed solvents and dispersal agent, and blended therein as by customary laboratory equipment. The two-step process thus described is effected under ambient conditions; there being no concern as to obtaining a particular temperature, pressure, or level of humidity, so that obtaining room conditions control and thereby immeasureably add to the economy in production.

As indicated above, dispersion preparations formed in accordance with the foregoing may be adapted for dispensation in any preselected or convenient manner. The same may be used as in a bulk form, that is, as for discharge by pouring, spraying, or squirting, as through a pump, directly upon the material to be treated, or by dispensing to an application, such as, a brush, rag, or other like expedient.

Equally, these preparations are amenable for forming aerosol preparations for dispensing under a suitable propellant, such as, compressed gas or liquefied hydrocarbons and halocarbons, or combinations of the same. The preparations are charged to suitable containers in accordance with common practice.

It is, of course, to be understood that since the preparations of this invention are dispersions, the same must be subjected to agitation immediately prior to discharge to assure of appropriate distribution of the ingredients throughout the quantity discharged whereby the same will have the desired consistency.

In view of present technology, it is recognized that dispersions of the present invention may be made homogeneous by utilization of well known stabilizing agents, such as, artificial thickeners, for example, methyl cellulose, with the latter obviating the necessity of agitation prior to usage. But it has been found that the inclusion of such stabilizers, although not adversely affecting the efficacy of the solvent or solvents, only serve to increase unduly the cost of manufacture.

I claim:

1. A non-emulsified solvent preparation in the nature of a dispersion for direct action upon a composition to be treated which is extrinsic of said preparation consisting essentially of a solvent forming the active ingredient of the preparation and being from the class consisting of water soluble solvents, combinations and mixtures of water soluble solvents, water insoluble solvents, combinations and mixtures of water insoluble solvents, and combinations and intermixtures of water soluble and water insoluble solvents, said solvent being within the range of approximately 0.1% to 89.9% by weight of the preparation, and a dispersal agent consisting of cocodiethanolamide within the range of approximately 0.1% to 10% by weight of the preparation, said cocodiethanolamide being an amber liquid having a congealing point of approximately 6° C., a specific gravity at 25° C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water in low concentrations of 1% to 2%, and with the balance of the preparation being water.

2. A non-emulsified solvent preparation in the form of a dispersion as defined in claim 1 wherein the solvent is organic.

3. A non-emulsified solvent preparation in the form of a dispersion as defined in claim 2 having a multiplicity of solvents for independent treatment of compatible reactive masses in the composition being treated.

4. A non-emulsified solvent preparation in the nature of a dispersion for direct action upon a composition to be treated which is extrinsic of said preparation comprising a solvent forming the active ingredient of the preparation and being from the class consisting of water soluble solvents and combinations and mixtures of the same, said water soluble solvent constituting approximately 0.1% to 89.8% by weight of the preparation, a solution inhibiting agent for preventing the solvent from going into solution, said agent constituting a minimum amount of approximately 0.1% by weight of the preparation, a dispersal agent consisting of cocodiethanolamide within the range of approximately 0.1% to 10% by weight of the preparation, said cocodiethanolamide being an amber liquid having a congealing point of approximately 6° C., a specific gravity at 25° C. of about 0.99, containing a maximum of about 3–4 percent free or unreacted fatty acid (as lauric acid) and having a pH value of 8–9 as one percent dispersion in water, and being soluble in alcohols, glycols, ketones, esters, aromatic and aliphatic hydrocarbons, and chlorinated solvents, and also being dispersible in water in low concentrations of 1% to 2%, and water constituting approximately 10% to 99.7% by weight of the preparation.

5. A non-emulsified solvent preparation in the form of a dispersion as defined in claim 4 wherein the solution-inhibiting agent is water insoluble.

6. A non-emulsified solvent preparation in the form of a dispersion as defined in claim 4 wherein the solution-inhibiting agent is at least one water insoluble solvent.

7. A non-emulsified solvent preparation in the nature of a dispersion for direct action upon a composition to be treated which is extrinsic of said preparation comprising a solvent forming the active ingredient of the preparation and being from the class consisting of water insoluble solvents, combinations and mixtures of the same, said solvent being within the range of approximately 0.1% to 89.9% by weight of the preparation, a dispersal agent consisting of cocodiethanolamide within the range of approximately 0.1% to 10% by weight of the preparation, said cocodiethanolamide being an amber liquid having a congealing point of approximately 6° C., a specific gravity at 25° C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water in low concentrations of 1% to 2%, and with the balance of said preparation being water.

8. A non-emulsified solvent preparation in the form of a dispersion as defined in claim 4 or 7 wherein the solvent is organic.

9. A non-emulsified solvent preparation in the nature of a dispersion for direct action upon a composition to be treated which is extrinsic of said preparation comprising a solvent forming the active ingredient of the preparation and being from the class consisting of an intermixture of organic water soluble solvents and organic water insoluble solvents which solvents collectively are within the range of approximately 0.1% to 89.9% by weight of the preparation, a dispersal agent consisting of cocodiethanolamide within the range of approximately 0.1% to 10% by weight of the preparation, said cocodiethanolamide being an amber liquid having a congealing point of approximately 6° C., a specific gravity at 25° C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water in low concentrations of 1% to 2%, and with the balance of the preparation being water.

10. A non-emulsified solvent preparation in the nature of a dispersion as defined in claim 9 wherein the organic water insoluble and organic water soluble solvents are from the class consisting of aromatic hydrocarbons, aliphatics, aliphatic petroleum naphthas, lacquer diluents, chlorinated hydrocarbons, alcohols, esters, glycols, glycol ethers, ketones, phthalate solvents, ethers, oxides, and fluorocarbons.

11. A non-emulsified solvent preparation in the form of a dispersion as defined in claim 10 wherein the water insoluble and water soluble solvents are preselected in predetermined proportionality compatible with the various types of reactive masses within the composition to be treated by such preparation.

* * * * *